(No Model.) 3 Sheets—Sheet 3.

H. J. CASE.
BUNDLE CARRIER FOR GRAIN BINDERS.

No. 388,630. Patented Aug. 28, 1888.

Witnesses
Wm H. H. Knight
H. R. Kennedy

Inventor
H. J. Case
By his Attorney
Philip T. Dodge

UNITED STATES PATENT OFFICE.

HENRY J. CASE, OF AUBURN, NEW YORK, ASSIGNOR OF ONE-HALF TO D. M. OSBORNE & COMPANY, OF SAME PLACE.

BUNDLE-CARRIER FOR GRAIN-BINDERS.

SPECIFICATION forming part of Letters Patent No. 388,630, dated August 28, 1888.

Application filed July 30, 1886. Serial No. 209,577. (No model.)

*To all whom it may concern:*

Be it known that I, HENRY J. CASE, of Auburn, in the county of Cayuga and State of New York, have invented certain Improvements in Bundle-Carriers for Grain-Binders, of which the following is a specification.

This invention relates to improved means by which the sheaves bound by a grain harvesting and binding machine will be carried therewith and delivered at the will of the operator a number at a time.

The aims of the invention are to provide a carrier which will be at once simple, inexpensive, and easily operated, which will deliver the bundles to the ground gently and easily, and which may be readily detached at will or placed in an elevated position to admit of the machine passing gates or other restricted openings.

With these ends in view the invention consists, essentially, in a horizontal table or other appropriate carrier connected to the frame of the harvester by a pivot, journal, or hinge arranged in an oblique position, so that the rear end of the carrier is caused to swing downward and outward from the machine to effect the discharge of the bundle; in the construction of the pivotal connection in such manner that the carrier-table may be turned upward to a reversed position; in a construction of the pivotal connections which admit of the table being instantly removed at will; in a latch mechanism of peculiar construction for sustaining the table in its operative position; in latch-operating devices extended to a point near the driver's seat in order that the table may be conveniently released to discharge the bundles at will, and in an arrangement of operating devices by which the driver is enabled to restore the carrier to its operative position, all as hereinafter more fully explained.

Figure 1:
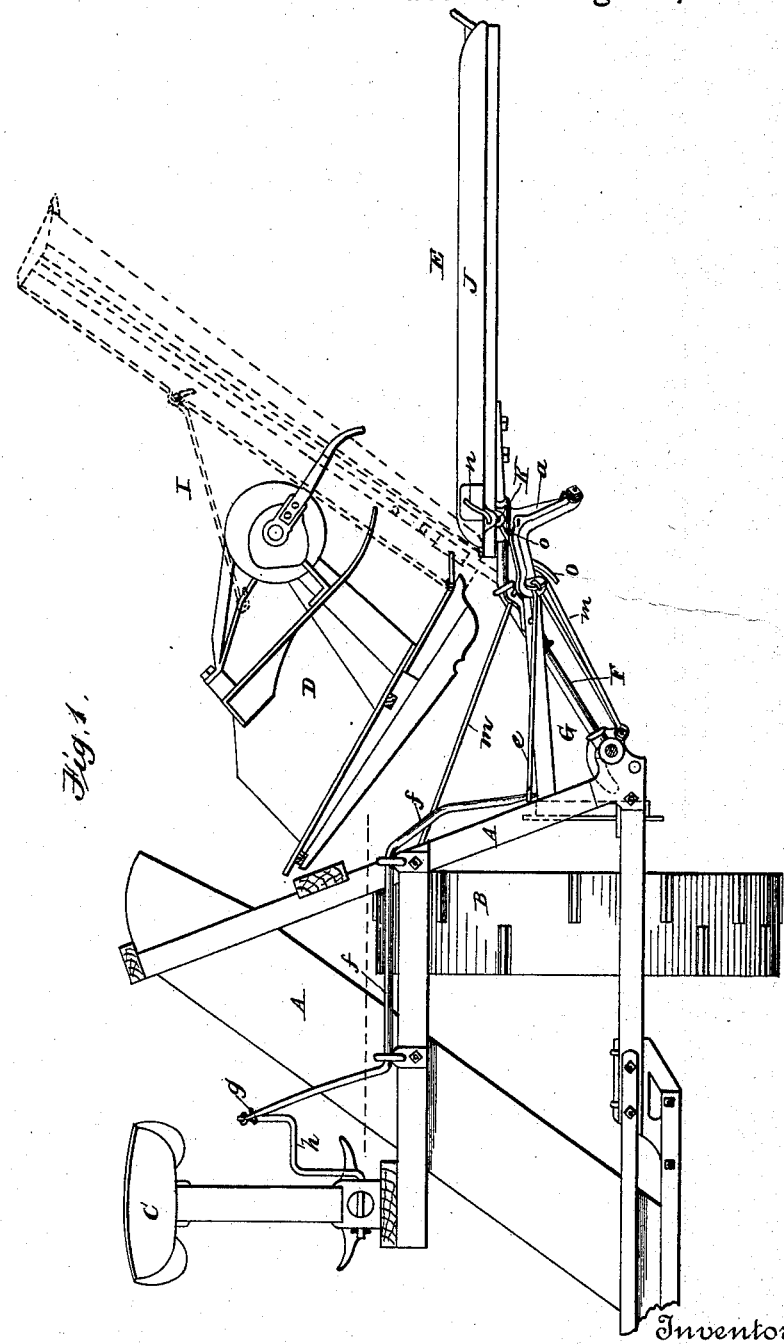
Figure 2:
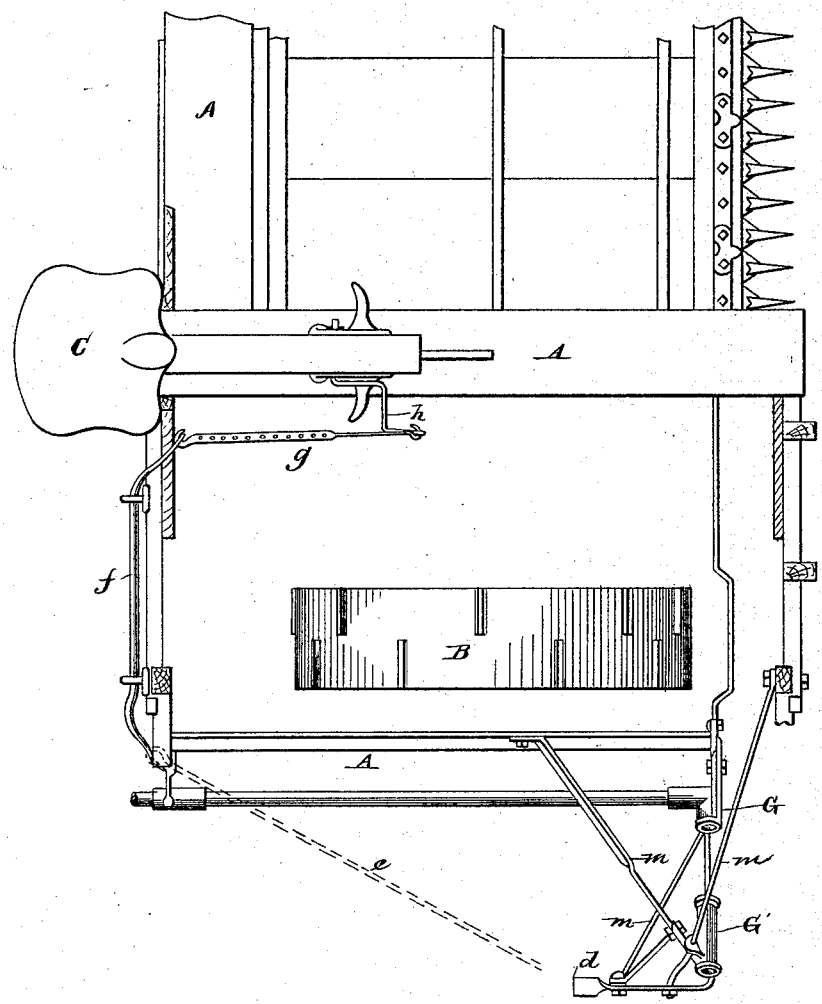
Figure 3:
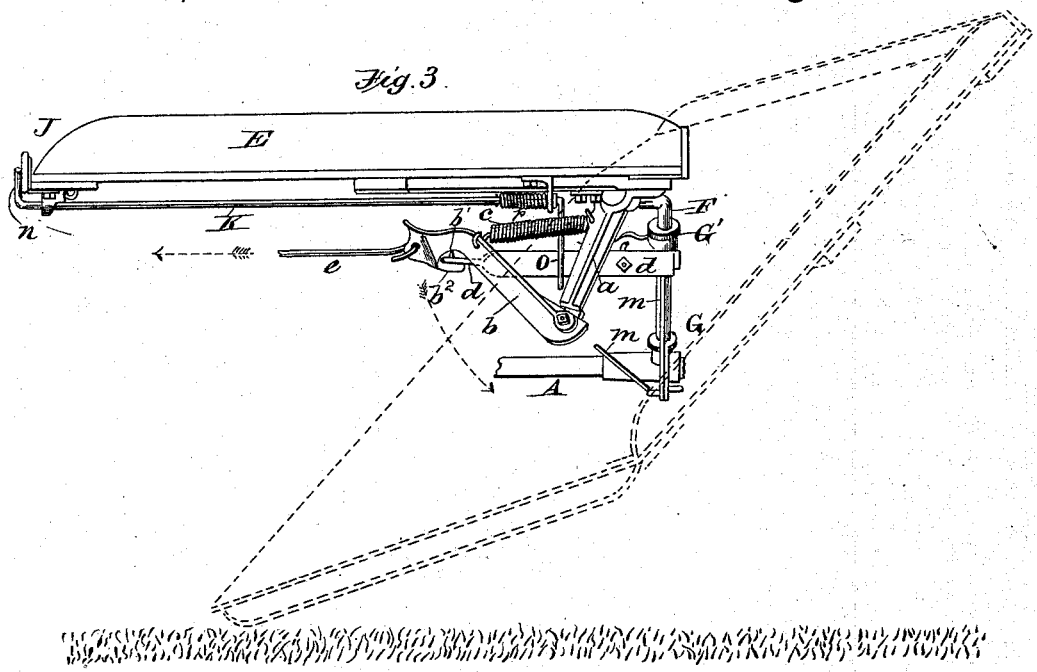
Figure 4:
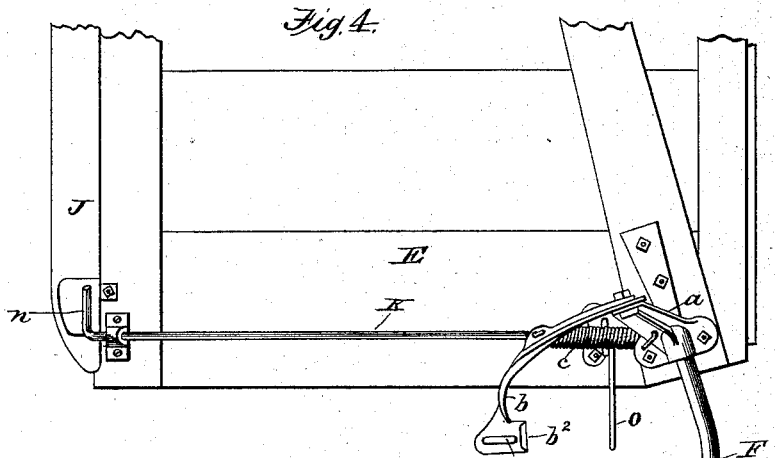
Figure 5:
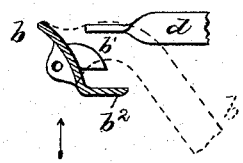

Referring to the accompanying drawings, Figure 1 represents a rear elevation of the principal parts of a grain harvesting and binding machine with my carrier applied thereto. Fig. 2 is a top plan view of the harvester and the table supporting and controlling attachments, the carrier being removed to expose the parts thereunder, its operative position being indicated by dotted lines. Fig. 3 is an elevation of the table and its attendant parts, viewed from the outer or stubble edge. Fig. 4 is a bottom plan view of the inner edge of the carrier-table and its attachments. Fig. 5 is an elevation, partly in section, showing the construction of the latch and the arm with which it engages to sustain the carrier-table.

A represents the frame of a harvester; B, the main wheel; C, the driver's seat, and D a grain-binding machine attached to the harvester-frame outside of the main wheel with an overhanging binding-table. The foregoing parts, as shown, are of ordinary construction, and may be modified at will, my improvements being applicable to harvesting and binding machines of various forms at present known in the art.

In proceeding to apply my invention I provide a table or bundle-carrier, E, preferably of a flat form, as shown, and secure rigidly thereto, at or near its forward end, a pivot arm or journal, F, extending in the direction of the length of the cutter-bar and with an inclination downward toward the harvester, as shown. To the harvester I secure rigidly, in any suitable manner, two sockets or bearings, G G', located beneath the binding-table and adapted to give a firm support to the inclined arm F, which may be inserted therein or withdrawn instantly therefrom when the carrier is to be detached. The carrier-table thus supported by the inclined pivot will, when released, swing downward at the rear end to an oblique position, with a movement outward from the harvester, caused by the bend in the arm or journal F, whereby the bundles thereon are caused to slide rearward and outward to the ground.

For the purpose of maintaining the carrier-table in its horizontal position until a sufficient number of bundles have been delivered thereto from the binder, I propose to employ a latch or sustaining device of any appropriate character under the control of the driver.

I recommend as the most simple and satisfactory means for sustaining the table the devices shown in Figs. 1, 3, and 4. An arm, *a*, is bolted rigidly to and extends downward from the under side of the table, and is pivoted at its lower end to an angular latch, *b*, the upper end of which is connected to a spring, *c*, and provided with an upper lip, *b'*, and an under lip, $b^2$, as shown in Fig. 3. A horizontal arm, $d$, is bolted rigidly to the harvester-frame or an extension thereon, and presents its rear end in such position that when the table is carried upward to a horizontal position the rear end of the latch will ride upward over the end of the arm, engaging the latter between the lips $b'$ and $b^2$, as shown in Fig. 3. With the parts in this position the arm O holds the upper end of the latch $b$, and the latter, in turn holding the lower end of the arm $a$, retains the table in its position. As the table rises to its place, the spring $c$ permits the end of the latch to slide outward beneath the end of the arm $d$ and causes it to spring inward again as soon as the lip $b'$ is carried above the arm. The lower lip, $b^2$, which encounters the under side of the lip $b$, is used merely to prevent the latch from being thrown too high or above its operative position. A rod or chain, $e$, is extended from the free end of the lip $b$ to a crank on one end of a rock-shaft, $f$, which is mounted in bearings on the harvester, and provided at its opposite end with a second crank connected by an adjustable link, $g$, to a foot-lever or treadle, $h$, mounted on the harvester-frame adjacent to the driver's seat. In their normal condition the parts stand in the position shown in Figs. 1 and 3, the table being sustained by the latch, as before described. If, now, the rod $e$ be drawn rearward by the action of the foot-lever or otherwise, the upper end of the latch $b$ will be drawn rearward until its lip $b'$ passes off from the arm $d$, thereby unlocking the table, which latter descends by gravity to the position shown by dotted lines. As the table descends, the latch $b$ and the end of the rod $e$ are carried downward, until finally the rod "passes the center" and assumes such position that when the rod is again drawn rearward by the foot-lever it will, through the latch which serves for the moment as a link or connection only, throw the table sharply or quickly upward to its original position, whereupon the latch will automatically engage, as before. Thus it will be seen that the rod $e$ is caused to serve the double purpose of unlocking the table that it may fall and of raising it again to an operative position. The pivotal connection is so arranged that the table may be revolved until it assumes a reversed and elevated position, bottom side up, as shown by dotted lines in Fig. 1. It may be secured in this position by means of a hooked rod, I, connecting it to the binder-frame, or by any other appropriate devices, which will readily suggest themselves to a mechanic of ordinary skill.

It will be observed that when the table is elevated the machine is adapted to pass through gates and openings too narrow to permit of the passage of the table in operative position.

Referring to the details of the pivot-supports, it will be seen that the lower bearing, G, is bolted directly to the harvester-frame, while the outer bearing or socket, G', is sustained by a series of rods or braces, $m$, extending thence in divergent lines to the frame. The arm $d$ is connected to the outer bearing and its supporting-arms, as shown, whereby it is held rigidly in position.

In order to prevent the accidental escape of the bundles from the rear end of the table at an improper time, and to assist in delivering them gently upon the ground, I provide the rear edge of the table with a movable guard or detent, J, preferably in the form of a board hinged thereto. This board is held normally in an upright position by a crank on the rear end of a rock-shaft, K, which is seated in bearings on the under side of the carrier-table, and provided at its forward end with a second crank-arm, $o$. As the table descends, the arm $o$, encountering a stationary part, will turn the shaft, so that the arm $n$ will release the guard J and permit it to turn downward flush with the table, that the bundles may pass thereover. A spring, $p$, encircling the shaft K acts to hold it normally in the position shown in Fig. 3.

Having thus described my invention, what I claim is—

1. In combination with a grain harvesting and binding machine, a socket or bearing near its front on the stubble side, and the horizontal or approximately horizontal sheaf-carrying table provided with the arm or journal seated in said socket or bearing, said arm and socket having a downward inclination toward the harvester, substantially as described, whereby the rear end of the table is caused to swing outward as it descends.

2. In combination with a grain harvesting and binding machine, the horizontal or substantially horizontal bundle-carrying table, and a supporting shaft or journal attached to said table and seated in bearings on the frame, its axis extending at right angles to the line of travel with an inclination upward from the machine.

3. In combination with a harvesting and binding machine, a sheaf-carrier and a connecting pivot or journal, substantially as described, having its axis of rotation inclined from the horizontal and adapted to permit the carrier to be turned thereon from a horizontal operative position to an upright position, bottom side up, whereby the passage of the machine through narrow openings is permitted.

4. A harvesting-machine provided with a socket inclined from the horizontal, in combination with a sheaf-carrying table having the supporting journal or pivot fixed rigidly thereto, seated in the socket and retained solely by gravity, as described, whereby the instantaneous disconnection of the table is permitted by withdrawing its journal from the socket.

5. A harvesting and binding machine having the inclined sockets or bearings attached thereto, in combination with the sheaf-carrying table having the journal fixed rigidly thereto, seated in the bearings and adapted for instantaneous withdrawal at will.

6. In combination with a harvester and binder, the sheaf-carrying table pivoted thereto to fall at its rear end, a spring-actuated latch jointed to the table and carried thereby, the fixed arm on the main frame to engage the latch and maintain the table in operative position, and the operating rod or chain connected to said latch, and serving, as described, the twofold purpose of disengaging the latch from the arm that the table may fall and of acting through the latch to lift the table from its depressed to its operative position.

7. In combination with a harvesting and binding machine, a sheaf-carrying table pivoted thereto to fall at its rear end, the pivoted latch and its actuating-spring connected to the table, a rigid arm, $o$, with which said latch engages to sustain the table, the operating-rod connected to the latch, and controlling devices connected to said rod and located adjacent to the driver's seat, whereby the driver is enabled to disengage the latch and permit the fall of the table, and subsequently to restore the table positively to its elevated position.

8. In combination with a downwardly-swinging table, the guard or bundle-detaining device hinged to its edge, and mechanism, substantially as described, actuated by the swinging of the table, for permitting said guard to turn downward out of action as the table descends.

9. The pivoted falling table, in combination with the fixed arm $o$, the arm $a$, latch $b$, and spring $c$.

In testimony whereof I hereunto set my hand, this 26th day of July, 1886, in the presence of two attesting witnesses.

HENRY J. CASE.

Witnesses:
T. M. OSBORNE,
J. FRANK DAVIS.